US008386513B2

(12) United States Patent
Victor et al.

(10) Patent No.: US 8,386,513 B2
(45) Date of Patent: *Feb. 26, 2013

(54) SYSTEM AND METHOD FOR ANALYZING, INTEGRATING AND UPDATING MEDIA CONTACT AND CONTENT DATA

(75) Inventors: Jon Victor, New Canaan, CT (US); Kurt Strumpf, Monroe, CT (US)

(73) Assignee: eNR Services Inc., Norwalk, CT (US)

( * ) Notice: Subject to any disclaimer, the term of this patent is extended or adjusted under 35 U.S.C. 154(b) by 1976 days.

This patent is subject to a terminal disclaimer.

(21) Appl. No.: 11/257,279

(22) Filed: Oct. 24, 2005

(65) Prior Publication Data

US 2006/0106874 A1     May 18, 2006

Related U.S. Application Data

(60) Provisional application No. 60/627,666, filed on Nov. 12, 2004, provisional application No. 60/645,858, filed on Nov. 20, 2005.

(51) Int. Cl.
*G06F 7/02* (2006.01)
(52) U.S. Cl. ........................ 707/772; 707/790
(58) Field of Classification Search .............. 707/790, 707/772
See application file for complete search history.

(56) References Cited

U.S. PATENT DOCUMENTS

| 5,819,092 | A | * | 10/1998 | Ferguson et al. | 717/113 |
| 5,832,499 | A | * | 11/1998 | Gustman | 707/740 |
| 6,038,573 | A | * | 3/2000 | Parks | 715/202 |
| 6,092,080 | A | * | 7/2000 | Gustman | 1/1 |
| 6,173,287 | B1 | * | 1/2001 | Eberman et al. | 715/232 |
| 6,185,573 | B1 | * | 2/2001 | Angelucci et al. | 705/1.1 |
| 6,353,831 | B1 | * | 3/2002 | Gustman | 707/740 |
| 6,618,727 | B1 | * | 9/2003 | Wheeler et al. | 707/748 |
| 6,993,532 | B1 | * | 1/2006 | Platt et al. | 707/736 |
| 7,716,251 | B2 | * | 5/2010 | Chang et al. | 707/802 |
| 2002/0152245 | A1 | * | 10/2002 | McCaskey et al. | 707/530 |
| 2004/0179102 | A1 | * | 9/2004 | Matsufune | 348/207.1 |
| 2010/0287458 | A1 | * | 11/2010 | Guller et al. | 715/205 |

* cited by examiner

*Primary Examiner* — Hung Q Pham
*Assistant Examiner* — Hubert Cheung
(74) *Attorney, Agent, or Firm* — Fish & Richardson P.C.

(57) ABSTRACT

A computer implemented system for integrating, searching, and updating media related databases comprising a first server for receiving digital content from at least one of a plurality of sources, a second server for receiving queries from at least one of a plurality of user computing devices, and a database access layer being utilized by the first and second servers to read and write to a plurality of databases. The plurality of databases comprise a content database and a media database. The content database receives at least one article of digital content from the first server via the database access layer and stores the at least one article. The media database contains at least one journalist data and media outlet data. A mapping module matches journalist data and media outlet data to at least one journalist data and media outlet data contained in the media database.

80 Claims, 7 Drawing Sheets

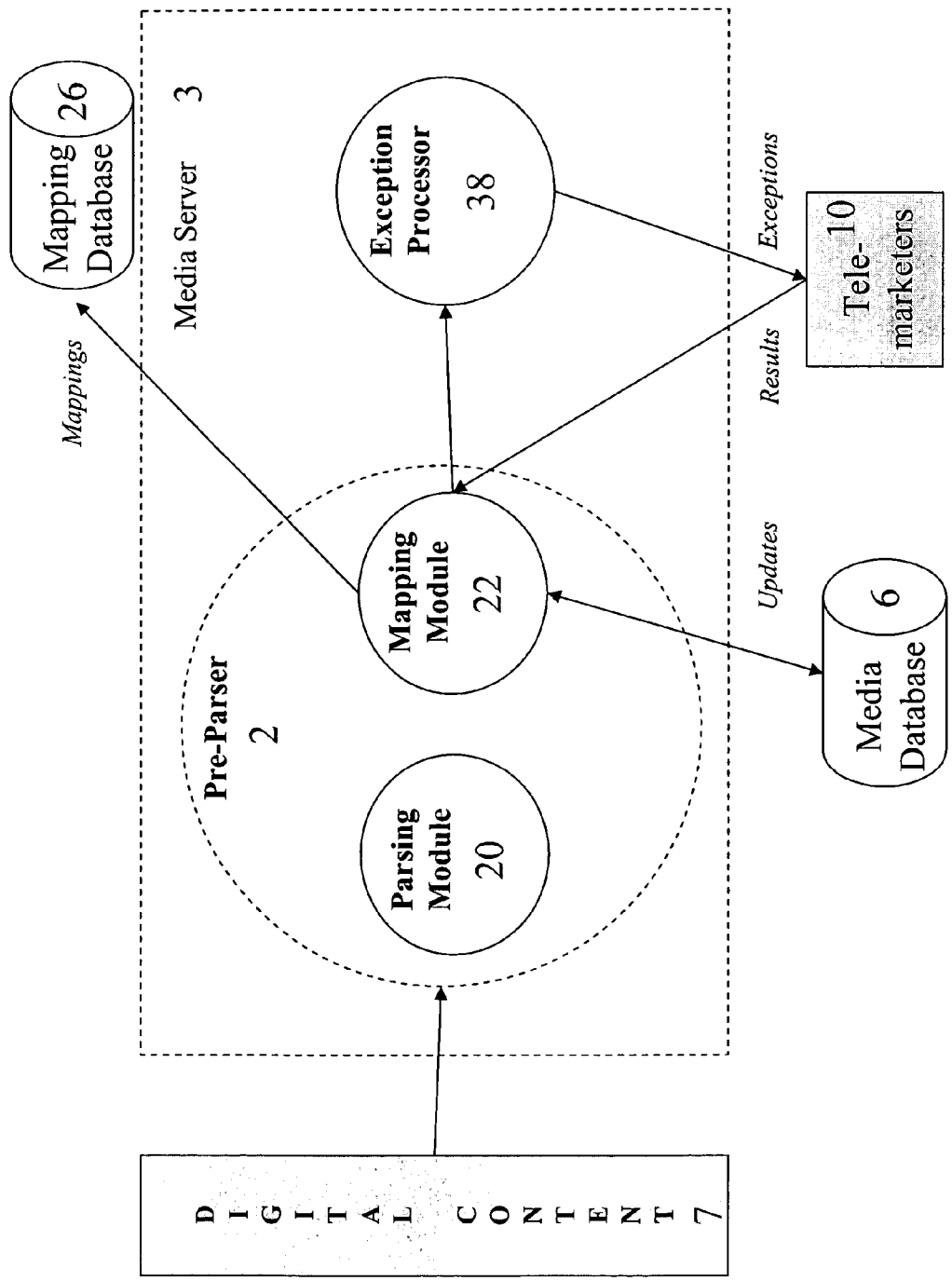

SYSTEM AND METHOD FOR ANALYZING, INTEGRATING AND UPDATING MEDIA CONTACT AND CONTENT DATA

RELATED APPLICATIONS

This application claims priority from U.S. Provisional Application No. 60/627,666, filed Nov. 12, 2004, and U.S. Provisional Application No. 60/645,858, filed Jan. 20, 2005, the disclosures of which are herein incorporated by reference.

BACKGROUND OF THE INVENTION

Media service companies maintain media contact databases ("MCD") containing thousands of media sites in the US and Canada, including daily and weekly newspapers, magazines, radio stations, TV stations and internet sites.

The MCD provides extensive contact information on each site, such as address, telephone, fax, email, station format and call letters (broadcast media) data.

In addition, the MCD contains data relating to every journalist (approximating 250,000-350,000 journalists) at each of these media sites that has editorial responsibilities including the ability and responsibility to generate independent content. Thus, for example, advertising directors are typically not included in the MCD whereas all reporters and newscasters are included in the database. The MCD contains all relevant contact information on each journalist, including address, telephone, fax and email, as well as each journalist's preferred method of receiving press releases (mail, fax or email). Additionally, the MCD also contains each journalist's "beat," or the journalist's subject/content area of responsibility. Beats include such titles as News, Features, Sports, Business, Entertainment, Technology, etc.

Public relations professionals use the MCD on behalf of their clients to identify individual journalists that might be most receptive to writing an article on the client. A toy company, for example, might retain a public relations professional to promote the release of a new toy. Typically, the public relations professional would first draft a press release announcing the new toy. The public relations professional would then utilize the MCD to generate a list of journalists who would be sent a press release, and maybe even a product sample.

The MCD contains a search facility that generates media contact lists according to defined search parameters, including media type, geography and beat. In the above example, the public relations professional might draft a release targeted to business editors and the trade press. The release would discuss the importance of this new toy to the company's product line and perhaps how this new toy extends the company's lead in a segment over its competitors. The public relations professional would then develop a media list consisting of business editors at the major daily newspapers, trade magazines and the major broadcast business shows. Depending on the search criteria, this list might include between 10 to 10,000 journalists. The public relations professional would then try to refine the list by accessing "pitching tips," or notes that subjectively describe a journalist's primary area of interest. Pitching tips are available through commercial providers and many public relations professionals also maintain a proprietary compilation of pitching tips.

These pitching tips, however, are typically subjective, often out-of-date, and never available for more than a handful of journalists. Accordingly, refining the list generated through the MCD search is often subjective and tedious.

Systems widely available today allow the public relations professional to upload the press release into an online application, and an integrated distribution capability distributes the release to every member of the media list according to the preferred method of receipt.

The current methods of targeting journalists utilizing beat or pitching tips are crude and tedious. Neither method works very well or efficiently. For example, many of the business reporters targeted above may be inappropriate recipients of the press release (and product sample). A journalist covering currency trading in Asia (obviously inappropriate) would be labeled a business reporter in the MCD, just as a journalist covering consumer product companies (more appropriate) would be labeled a business reporter in the MCD. Incorrect targeting entails substantial costs. Product samples sent awry are clearly a waste of money. But, time spent by public relations professionals pitching stories to journalists "off beat" waste value time and effort. Conversely, pitches that can be accurately targeted would be expected to produce a better result (more coverage in the press) at a lower cost.

Another problem encountered in the prior art is the time consuming and expensive problem of maintaining the currency and accuracy of the MCD. The MCD is a large, complex database typically consisting of over 250,000-350,000 entries, and each entry entails numerous data elements (name, address, etc.). The MCD, therefore, consists of millions of data elements that must be maintained and updated continuously.

The MCD requires constant updating. Journalists are continuously switching jobs and beats. Media sites (especially magazines) are continuously launched and closed. And both, media sites and journalists have proven unresponsive to potentially more economic, but impersonal, means (email, direct mail) of verifying relevant MCD data.

The currency and accuracy of the MCD has proven the key to customer satisfaction. Telemarketing has proven, and is currently, the only viable method of maintaining the currency of the MCD. Accordingly, companies that endeavor to maintain a media contact database expend significant sums on personally telephoning every media site and every journalist in the MCD to verify database elements.

But, telemarketing entails practical limits on the quality of the MCD. For instance, it is not possible to update the MCD daily. Even if it were possible to make 350,000 phone calls in one day, journalists would be extremely irritated after the first couple of days. MCD data, however, does change daily (on any given day, journalists change jobs, beats, or may die; media sites change addresses or close). The net result is that every day the MCD is out-of-date, and any updating effort is too little, too late.

One current industry approach is to segment media outlets. So-called "Tier I" sites and journalists are updated (personally contacted by telemarketers) more often than those in "Tier II or III." As an example, a Tier I journalist might be updated six times a year; a Tier II journalist might be updated several times a year. But the tiers are typically constructed based upon the prominence of the media site. *The New York Times*, and its journalists, are updated far more frequently than the *Kenosha Express*. This approach, however, makes no sense to the user that wishes to contact the *Kenosha Express*, and who wants accurate data today regardless of the relative prominence of the newspaper.

BRIEF DESCRIPTION OF THE INVENTION

It is an object of the invention to provide a method and system for integrating, updating, and searching media databases and building media lists and reports.

It is yet another object of the invention to provide a method and system which analyzes a journalist's output text to determine the journalist's current focus. In other words, a journalist's subject area of interest is determined according to the topics of the stories he actually writes.

It is a further object of the invention to provide an MCD Updating Process that will produce a substantial improvement in the currency and accuracy of the MCD at a substantial reduction in cost.

In accordance with the invention, there is provided a computer implemented system for integrating, updating, and searching media related databases and building media lists and reports comprising a first server for receiving digital content from at least one of a plurality of sources; a second server for receiving queries from at least one of a plurality of user computing devices; and a database access layer being utilized by the first and second servers to read and write to a plurality of databases, wherein the plurality of databases comprise a content database, a media database, a mapping database, and a report database. The content database receives at least one article of digital content from the first server via the database access layer and storing the at least one article. The media database receives at least one journalist data and media outlet data of digital content from the first server via the database access layer and stores the at least one journalist data and media outlet data. The mapping database stores mapping data between byline data and source outlet data of articles in the content database and journalist data and media outlet data in the media database for updating the media database. The report database stores user report requests.

The system further comprises an indexing database for receiving the digital content from the first server and maintaining an index of the digital content and an archiver for receiving the digital content from the indexing database for managing the indexing database and storing the digital content.

The system comprises a mapping module for comparing received digital content to mapping data stored in the mapping database and storing the digital content in a matched content database for articles that could be matched to journalists or an unmatched content database for articles that could not be matched to journalists. The system also includes an exceptions processor for pulling unmatched digital content data from the unmatched content database and formatting a call down project to telemarketers to update the unmatched digital content data and forward the updated digital content data to the content database via the mapping module.

The system further comprises a simple search engine for providing at least one web page to at least one of the plurality of user computing devices for a user to enter various search criteria.

In accordance with the invention, there is provided a method for searching media related databases comprising the steps of providing at least one web page to at least one of the plurality of user computing devices for a user to enter various search criteria at a simple search engine of a first server; creating a query at the first server and comparing query data to data in a matched content database including articles of digital content data received at a second server that could be matched to journalist data; providing the query results to the user computing device as a formatted web page via the first server including a mapping of the article contents and identifiers of the media outlet and the journalist with the related article from a mapping module at the second server.

There is also provided a method for searching media related databases comprising the steps of providing at least one web page to at least one of the plurality of user computing devices for a user to enter various search criteria at a simple search engine of a first server; receiving an uploaded press release document or a cut and paste content of a press release document at the at least one web page from one of the plurality of user computing devices; setting the uploaded press release document or the cut and paste content of the press release document as a training document for a press release, wherein the first server includes an upload document module for creating a new category in an indexing database of a second server of indexed digital content articles using an application processing index; using the training document at the indexing database to search for articles with a predefined percentage of content and creating a new category of such articles.

There is further provided a method for building custom media reports from a plurality of media related databases comprising the steps of providing at least one web page to at least one of the plurality of user computing devices from a gathers report application of a first server for users to enter various user criteria comprising industry, brand names, and date range to be included in a custom media report; receiving the input user criteria at the gathers report application; parsing the input user criteria; generating a standard report request; forwarding the standard report request to a report builder and formatting queries against an indexing database of a second server of indexed digital content articles; receiving results of the query including statistics and supporting articles from the indexing database at the report builder; receiving media data including journalist and media outlet data from a media database at the report builder; and providing the results of the query and the media data to the user computing device as a formatted web page with custom industry reports and links to more detailed information.

BRIEF DESCRIPTION OF THE INVENTION

The accompanying drawings, which are incorporated in and constitute a part of the specification, illustrate preferred embodiments of the invention and, together with the general description of the preferred embodiments given below, serve to explain the operation of the invention. It should be understood that the invention is not limited to the embodiments disclosed as examples, and is capable of variation within the scope of the appended claims. In the drawings, FIG. 1 represents a system for integrating, updating and searching various media data databases and building media lists and reports, in accordance with the invention.

FIG. 7 represents a method for updating the media contact database using the media server of FIG. 2.

DETAILED DESCRIPTION OF THE INVENTION

Figure 1:
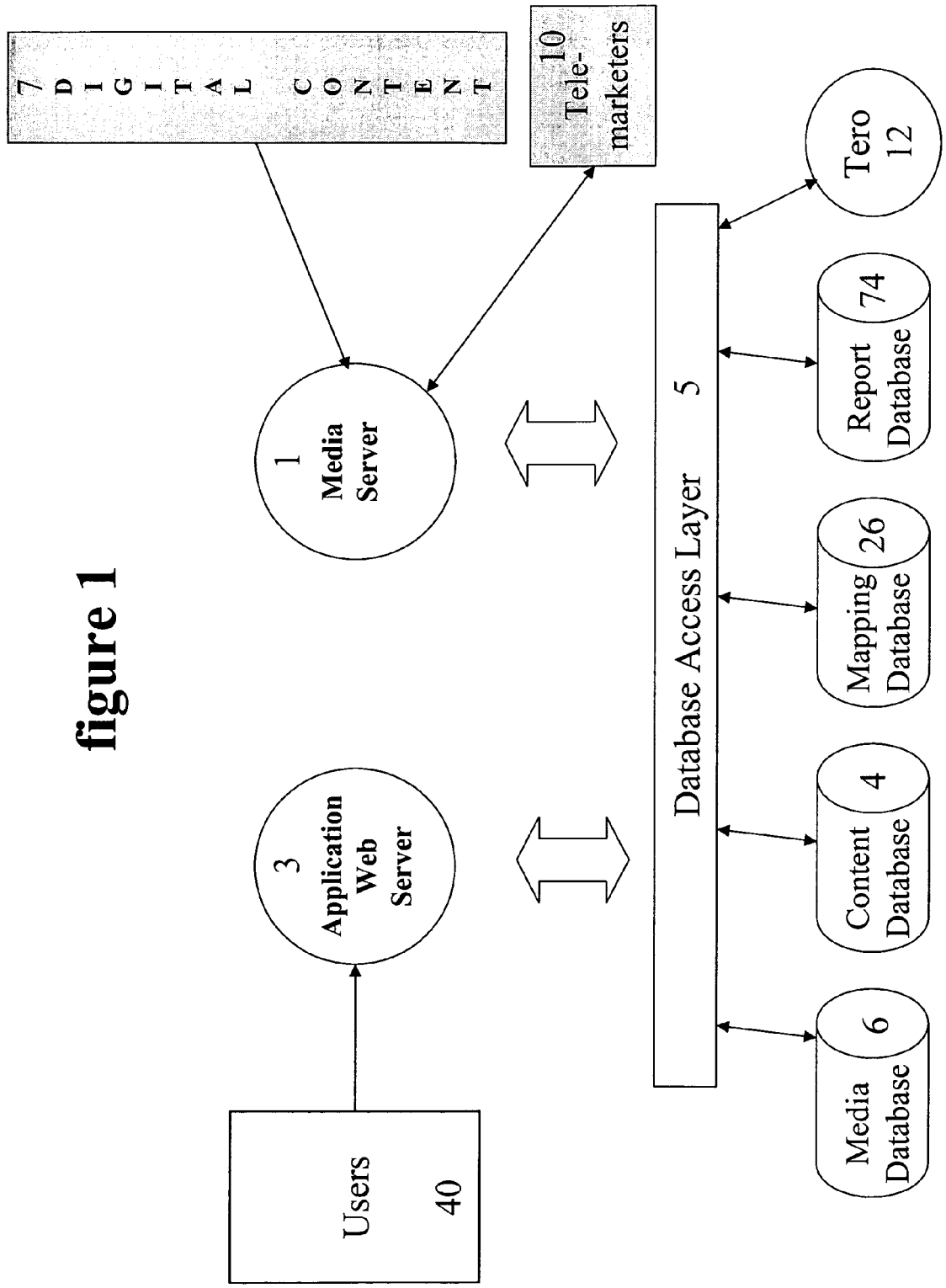

Referring to FIG. 1, the system for integrating, updating, and searching media databases and building media lists and reports includes Media Server (1), Application Web Server (3), Database Access Layer (5), Content Database (4), Media Database (6), Mapping Database (26), Report Database (74), Tero (12) and Telemarketers (10).

Media Server (1) receives Digital Content (7) from several sources that are referred to as feeds. The sources of Digital Content (7) (i.e., feeds) include but are not limited to content providers (such as DIALOG, LEXISNEXIS, etc.), media websites, media monitoring companies who "clip" and scan print media, TV sources wherein the content is available as transcripts or captured through closed captioning and stored digitally, and radio sources wherein the content is available as transcripts or captured and digitized by voice-to-text software. Media Server (I) reads and writes data from and to Content Database (4), Media Database (6), Mapping Database (26), Report Database (74) and Tero (12) via Database Access Layer (5).

Database Access Layer (5) comprises commercially available programming interfaces and processes utilized by Media Server (1) and Application Web Server (3) to read and write data from and to the various databases.

Users (40) include actual persons using a general computing device and/or remote devices configured to query Application Web Server (3). The User's (40) device, although not illustrated in FIG. 1, further includes software such as an operating system necessary for operation of the computer system and various applications and hardware such as a central processing unit and hard disks. The User's (40) device still further includes hardware (not shown) such as a modem, a Local Area Network (LAN) adapter, etc., for executing a data communication with Application Web Server (3).

Application Web Server (3) may incorporate various types of information servers including, for example, a world wide web ("WWW" or "web") server that provides web pages upon request. Application Web Server (3) is connected to a communications network such as a local area network ("LAN"), a wide area network ("WAN"), a public network, a private network, a virtual private network, a wired network, a wireless network, or various other types of communication networks. The function of the communication network is to carry content between Application Web Server (3) and Users (40).

Content Database (4) receives each article of Digital Content (7) in a feed from Media Server (1) via Database Access Layer (5) and stores the article according to its normalized schema (i.e. by byline, headline, summary, publishing time, etc.).

Media Database (6) receives each journalist and corresponding media outlet information of Digital Content (7) in a feed from Media Server (1) via Database Access Layer (5) and stores such journalist and media outlet information according to its normalized schema (i.e. outlet name, journalist name, title, beat, type of publication, outlet contact information, journalist contact information, etc.).

Mapping Database (26) stores mappings between bylines and source outlets of articles in the Content Database (4) and journalists and media outlets in the Media Database (6) via Database Access Layer (5).

Tero (12) maintains an index of current media Digital Content (7). Tero (12) is any commercially available indexing software that can analyze and index the text and support many different native languages, some currently available packages support up to 80 languages.

Communication channel(s) to and from, and/or among, Users (40), Application Web Server (3), Database Access Layer (5), Digital Content (7), Media Server (1), Media Database (6), Content Database (4), Mapping Database (26), Report Database (74) and Tero (12) transmit the electronic data in a timely fashion throughout the system. The communication channel(s) may be any one of local area network (LAN), wide area network (WAN), wireless application protocol (WAP), dedicated lines, satellite or any other device or system for transmitting electronic data in a timely fashion.

Although one User (40), Application Web Server (3), Database Access Layer (5), Digital Content (7), Media Server (1), Media Database (6), Content Database (4), Mapping Database (26), Report Database (74) and Tero (12) are shown, it is understood that any number of users, Application Web Servers, Database Access Layers, Digital Content sources, Media Servers, Media Databases, Content Databases, Mapping Databases, Report Databases and Tero devices may be embodied in accordance with the invention.

Figure 2:
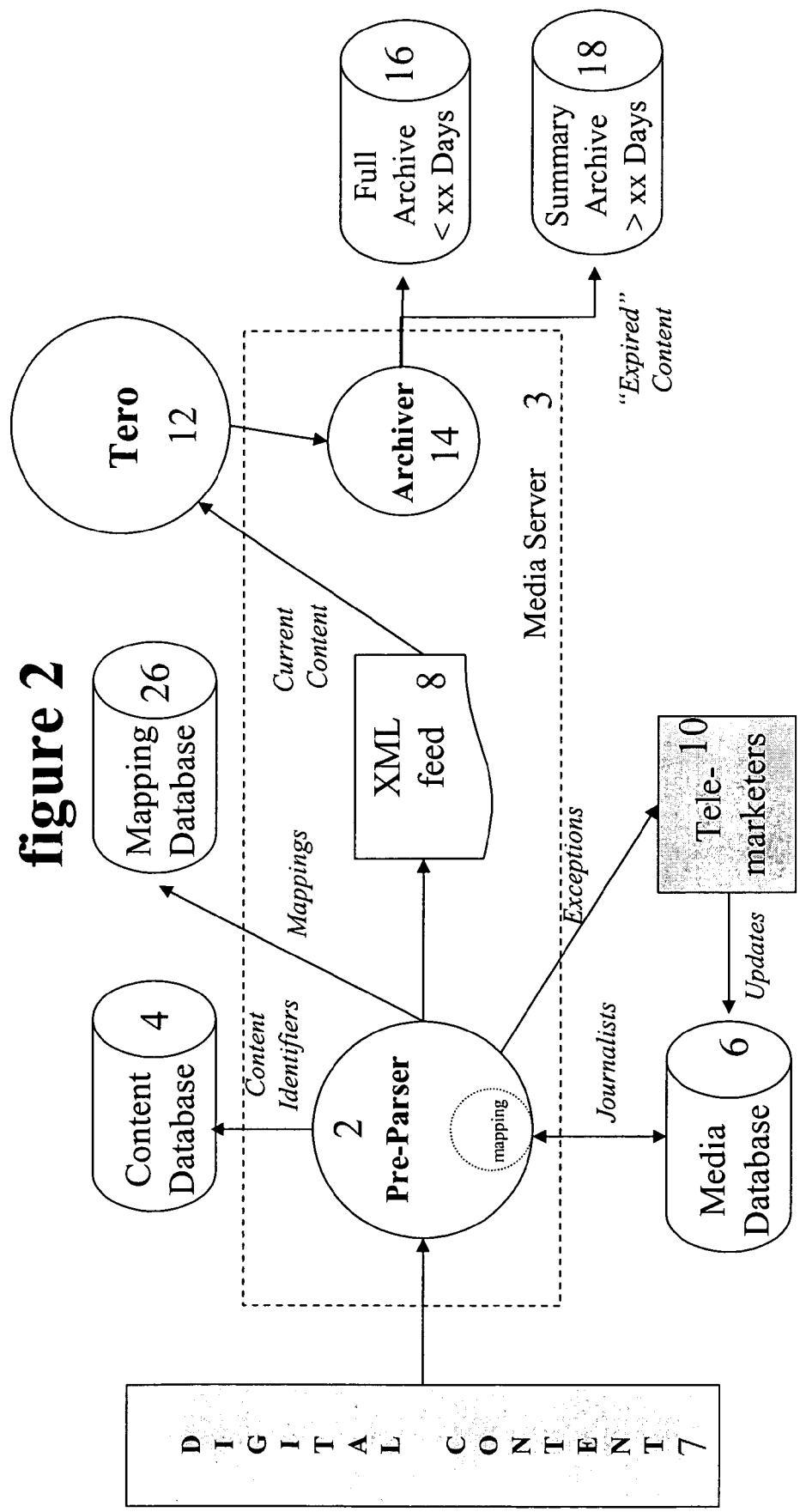
FIG. 2 represents a detailed depiction of the media server of the system of FIG. 1.

Referring to FIG. 2, the Media Server (1) of FIG. 1 further includes Pre-Parser (2), XML feed (8), Tero (12), and Archiver (14).

Pre-Parser (2) of Media Server (1) receives Digital Content (7) in various formats (i.e., XML, ASCII delimited, proprietary tagged formats) and delivery methodologies (i.e. push and pull methods) based on content source examples. Pre-Parser (2) receives each feed and parses out the relevant elements of the content data (i.e. Headlines, bylines, dates, content body, etc.). Pre-Parser (2) sends the parsed elements to Mapping Module (22) and ultimately converts the feed to XML format (8) to be forwarded to Tero (12) for indexing and Archiver (14) for archiving.

Pre-Parser (2) sends Digital Content (7) to be stored to Content Database (4).

Pre-Parser (2) queries and updates the Mapping Database (26) as it processes articles of Digital Content (7). As a result of the mapping processes, Pre-Parser (2) generates two outputs: (i) a normalized XML feed (8) for the Tero (12) and a set of exception reports for Telemarketers (10) research.

Tero (12) maintains an index of current media content. Archiver (14) manages the Tero content and removes expired content. Archiver (14) keeps a full archive (16) of all content for XX days and a Summary Archive (18) with full text removed for >XX days (XX is determined by a number of factors related to business needs and licensing constraints. XX is not a technical limitation).

Figure 3:
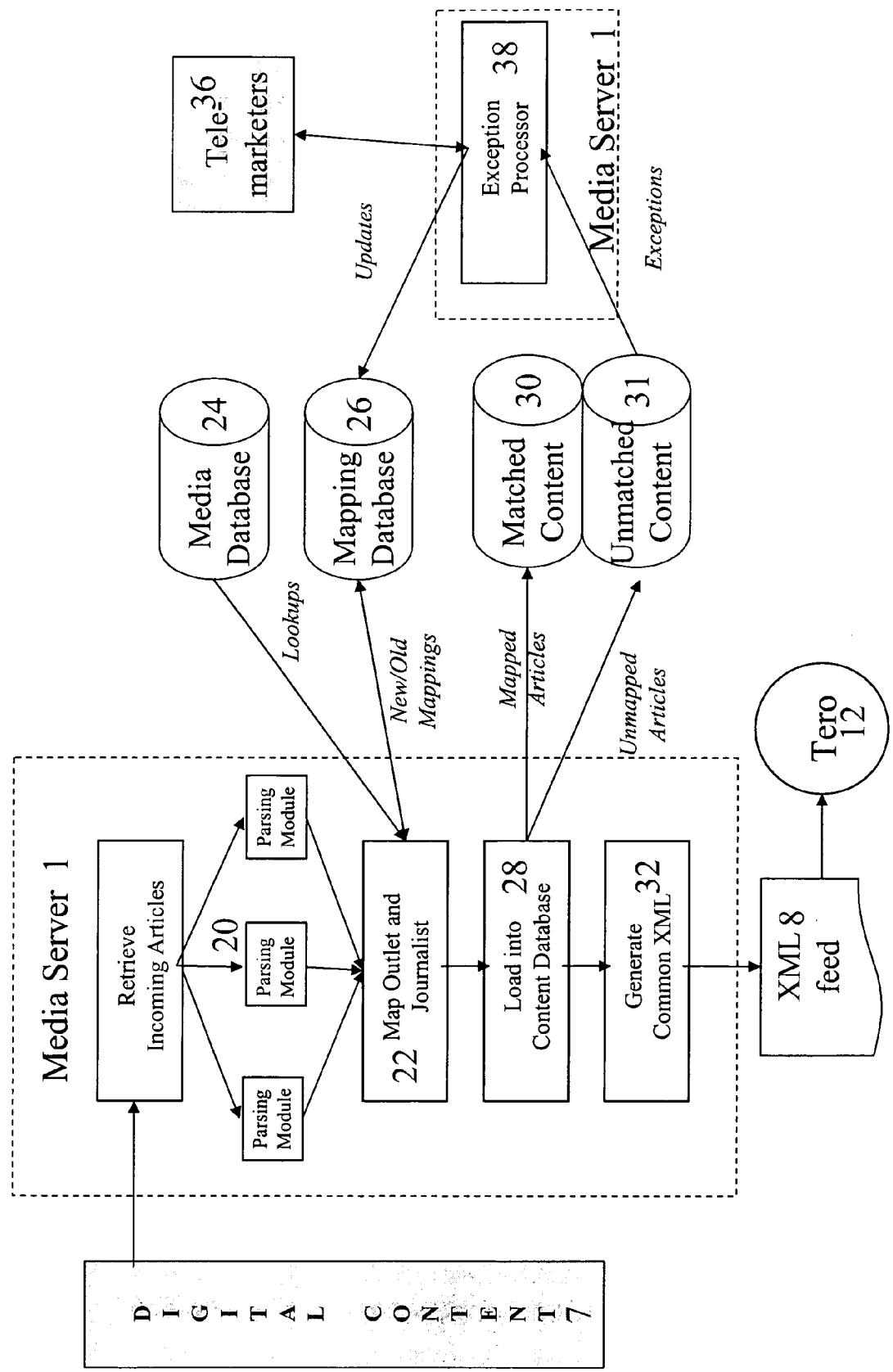
FIG. 3 represents a detailed depiction of the pre-parser of the media server of FIG. 2.

FIG. 3 provides a detailed depiction of Pre-Parser (2) shown in FIG. 2. Referring to FIG. 3, Pre-Parser (2) receives each Digital Content (7) feed in the various formats and delivery methodologies and passes each Digital Content (7) feed through the appropriate parsing module (20) to Mapping Module (22).

Mapping Module (22) compares the received feed to existing mapping information stored in Mapping Database (26). If the received feed does not match any of the existing mapping information, Mapping Module (22) attempts to identify new mapping that is to be stored in Mapping Database (26).

After the mapping process, Pre-Parser (2) loads the digital content article via Mapping Module (22) into either the Matched Content Database (30) of Content Database (4) for articles with mapped journalists, or the Unmatched Content Database (31) of Content Database (4) for articles that could not be mapped to journalists.

The Exceptions Processor (38) pulls data from the Unmatched Content Database (31) and formats a call down project for the Telemarketers (36). The Telemarketers (36) process and update the unmatched content data and send the updated data to Mapping Database (26). Mapping Database (26) forwards the updated data to Mapping Module (22), which loads the updated data into Content Database (4).

Pre-Parser (2) then generates a normalized XML file (32) of the digital content article for processing by Tero (12). The XML file (32) is sent to XML feed (8) which passes the XML file (32) to Tero (12).

Figure 4:
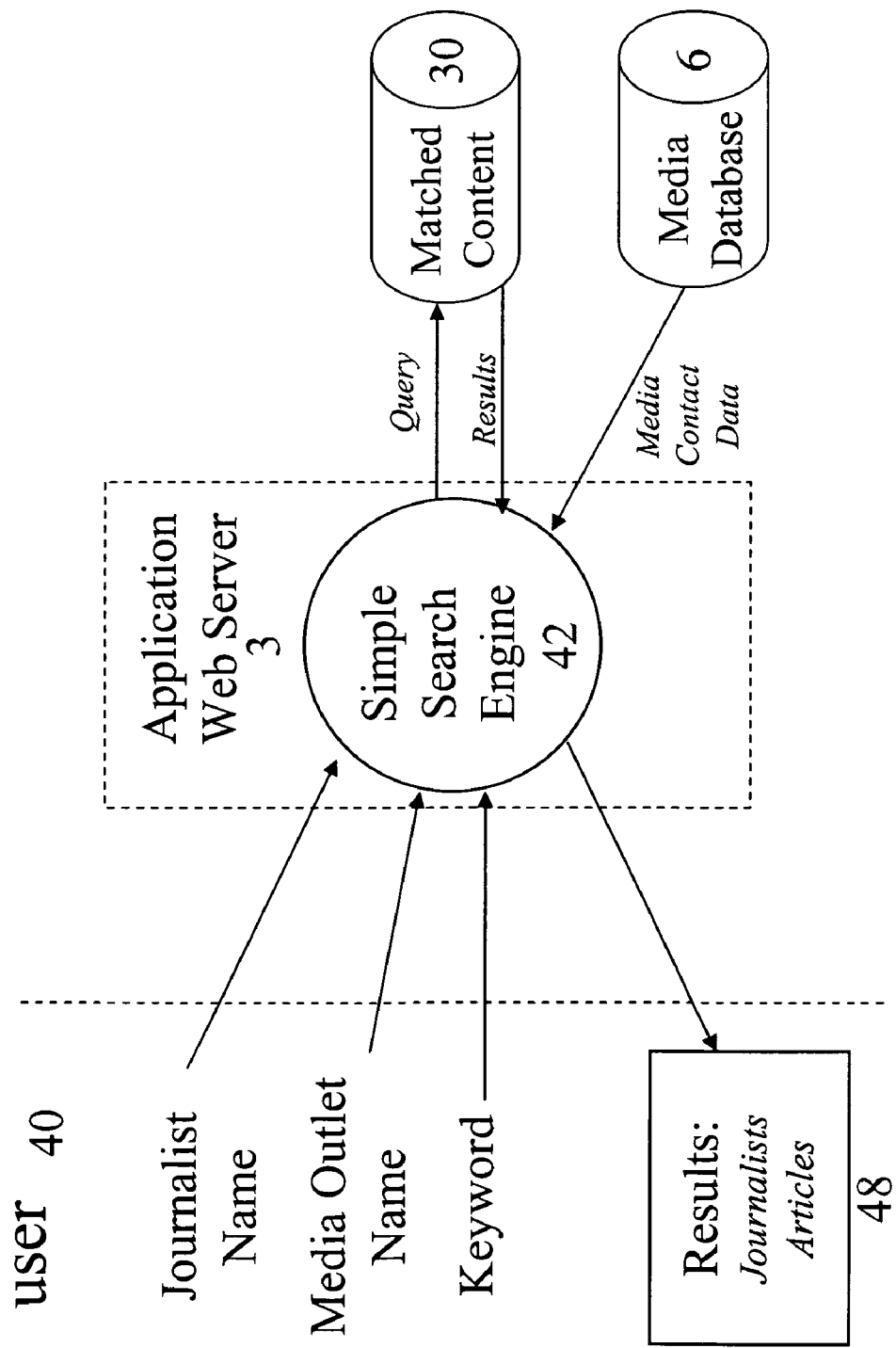
FIG. 4 represents methods for conducting a media content and/or media contact search using the application server of the system of FIG. 1.

Referring to FIG. 4, User (40) conducts a search by accessing Simple Search Engine (42) of Application Web Server (3) from any workstation using a supported Web browser. Simple Search Engine (42) provides User (40) with a web page on which to enter various search criteria. The User (40) can enter any of the following search criteria (i) Journalist Name (ii) Media Outlet Name or (iii) keyword. The Search Criteria and Search Type are then passed to Simple Search Engine (42). Simple Search Engine (42) creates a query and compares the query data to data in the Matched Content Database (30). The results are returned to the Simple Search Engine (42) with the article contents and the identifiers of the media outlet and journalist mapped for the related article. The Simple Search Engine (42) queries the Media Database (46) for media contact data about the media outlet and journalist and then provides the results of the search to the user as a formatted web page (48) with links to more detailed information.

Figure 5:
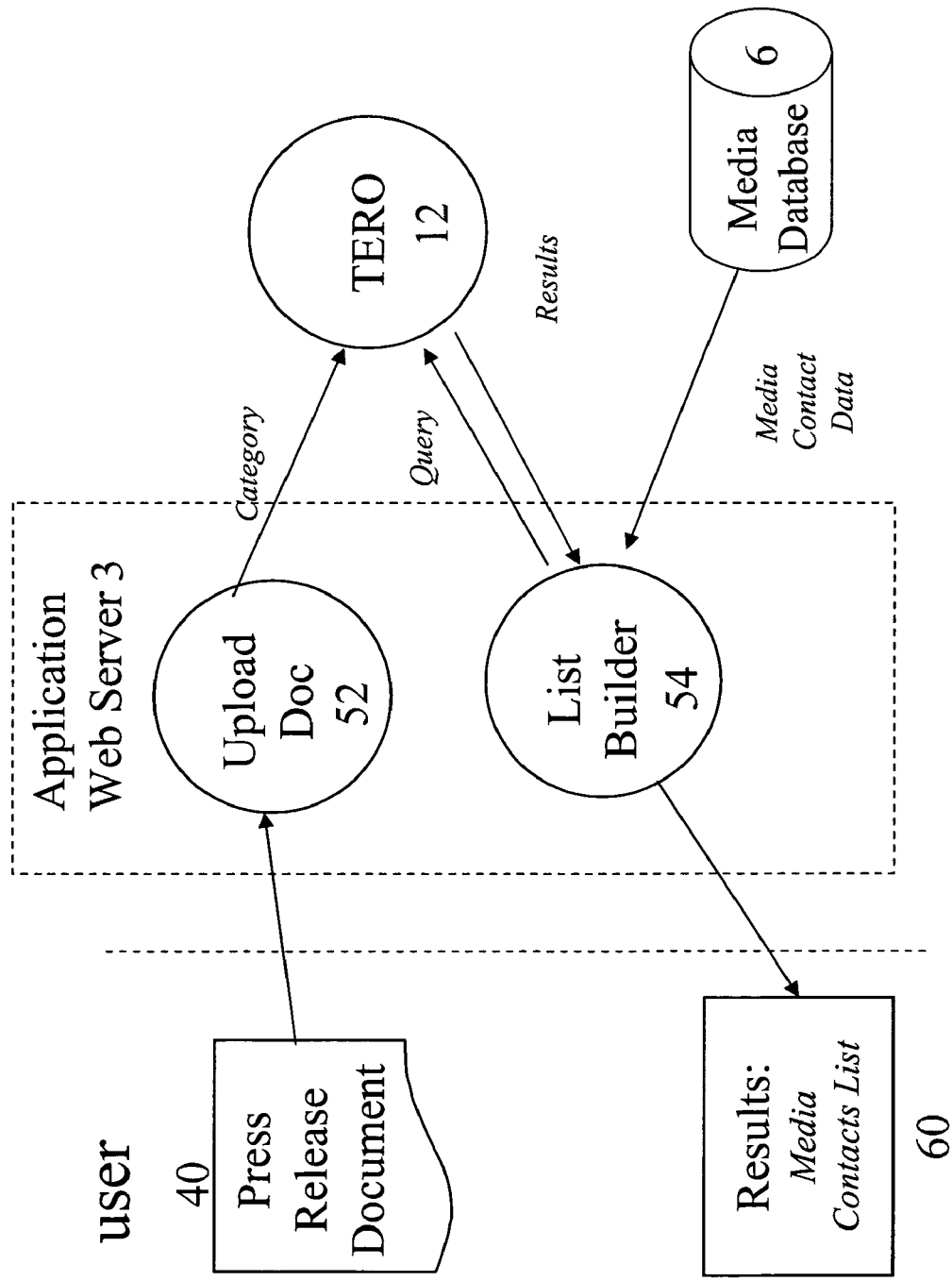
FIG. 5 represents methods for building media lists using the application server of the system of FIG. 1.

Referring to FIG. 5, User (40) such as a public relations professional accessing Application Web Server (3) can build a media list as a Web Page. User (40) can build the media list by inputting a press release ("target") on a given topic rather than journalist search criteria. Simple Search Engine (42) of Application Web Server (3) can then conduct a MCD search, match the target to all articles in the digital content that match the subject of the target, return to the User (40) a media list containing the names of all journalists that have recently written on the same topic as the target press release, and provide the User (40) with the ability to view each journalist's recent writing history.

Referring to FIG. 5, User (40) accesses Application Web Server (3) to (i) upload a press release document or (ii) cut and paste the content of a press release document (50) into the web page. The Upload Doc (52) module of Application Web Server (3) creates a new category in Tero (12) using a Tero Application Processing Index (Tero API) and sets the User's (40) press release document as the Training Document for this press release. Tero (12) uses this training document to seed the category (i.e., search for articles with a predefined percentage of content) with the list of relevant documents.

ListBuilder (54) of Application Web Server (3) queries Tero (12) for a list of all articles, including each mapped journalist identity in the newly created category. ListBuilder (54) sorts the list by relevance, applies filtering as needed, and then looks up the media contact information for each article from the Media Database (6). ListBuilder (54) presents the resulting list to User (40) as a formatted web page (60) with links to more detailed information. For example, User (40) can click on a journalist name to view a list of recent headlines or storylines authored by the journalist. Subsequent clickthroughs provide the User (40) with an abstract of each article and further clickthroughs provide the User (40) with a stored copy of the entire article.

Figure 6:
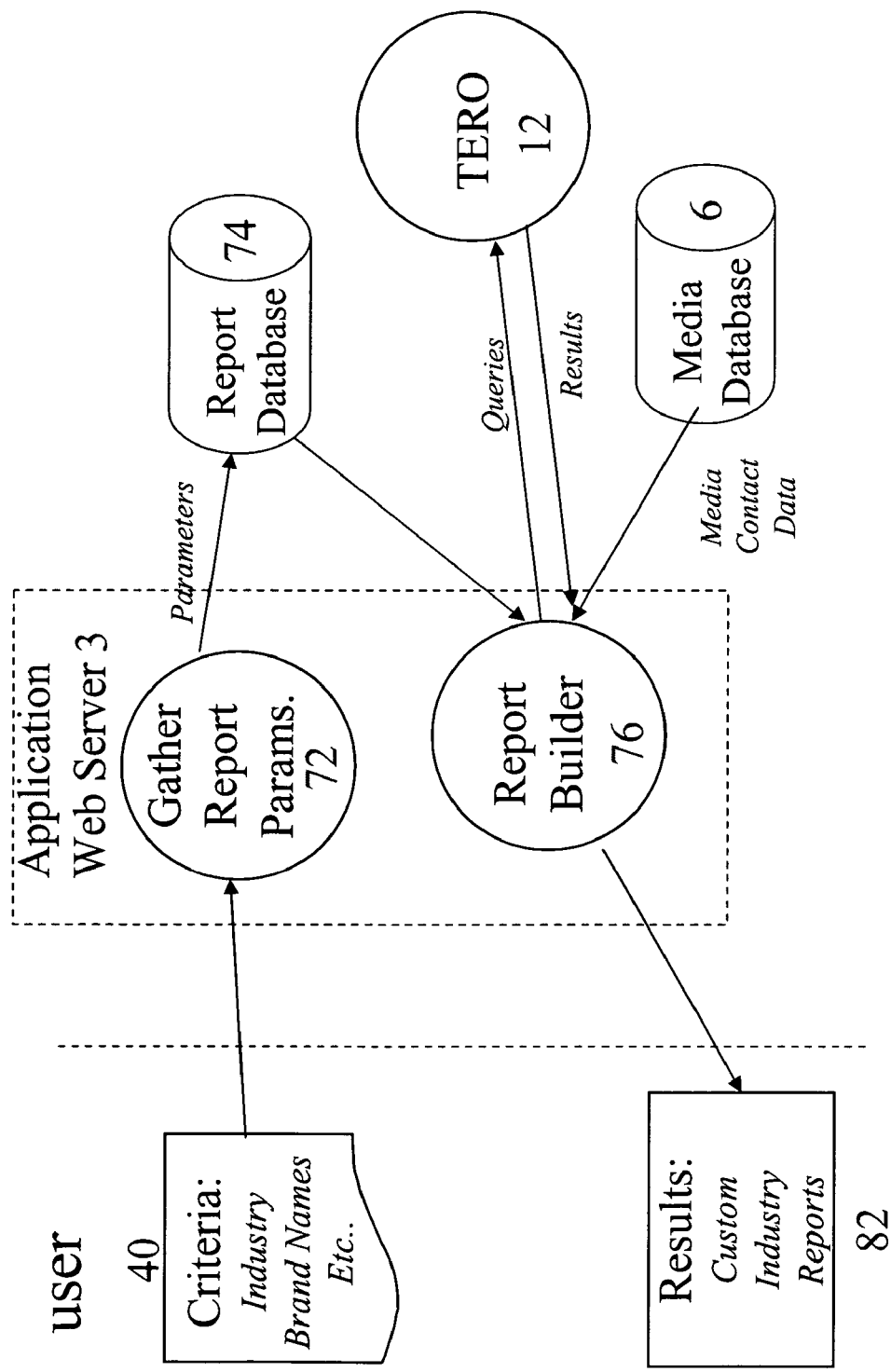
FIG. 6 represents a method for building media reports using the application server of the system of FIG. 1.

Referring to FIG. 6, User (40) can access Application Web Server (3) to generate a custom industry report. User (40) accesses a system web page of Application Web Server (3) and enters criteria (70) such as Industry, Brand Names, Date Range etc. to be included in a report request. Gather Reports (72) of Application Web Server (3) parses the User's (40) input and generates a standard report request to be stored in the Report Database (74).

Report Builder (76) a processor of Application Web Server (3) receives the standard requests from the Report Database (74) and formats queries against Tero (12). Tero (12) returns the results for the queries which include statistics and supporting articles to Report Builder (76). Report Builder (76) takes the data from the Tero queries and data from Media Database (6) and provides this data to User (40) as a formatted web page with Custom Industry Reports (82) and links to more detailed information.

Referring to FIG. 7, Pre-Parser (2) receives Digital Content (7) from several sources or feeds. The relevant Parsing Module (20) of Pre-Parser (2) parses the Digital Content (7) article and identifies each Digital Content (7) article including but not limited to media outlet "Source", "Headline", "Section" (where broadcast or print edition of the Digital Content (7) article was found).

Pre-Parser (2) then sends the fields parsed from each piece of Digital Content (7) to a Mapping Module (22) that determines the mapping between the articles "Source" and "Byline" and the Media Databases (24) "media outlet" and "journalist". The Mapping Module (22) uses the Mapping Database (26) to determine if a mapping already exists or uses a series of algorithms to identify a new mapping.

When a match is found, the Section is used to confirm or update the Journalist's beat or coverage data. The Journalist is marked as "ACTIVE" in the Mapping Database (26).

When a Journalist match is found at a different source, the possible alternate source is noted and the Journalist is marked as "REQUIRES UPDATE" in the Mapping Database (26).

When no Journalist match is found at all, the Journalist and Source pair are marked as "NEW" and placed in the daily exception report in the Mapping Database (26).

The REQUIRES UPDATE and NEW exception reports are sent to the Exceptions Processor (38) for processing to remove duplicates and then sent to Telemarketers (10) for updating. Telemarketers (10) are provided with contact information for the Source and all the parsed information available for a Journalist. Telemarketers (10) use a customized script to obtain and update the relevant contact and beat information for the Journalist.

Telemarketers (10) make the necessary calls and return the updated information within a 24-hour time period. Journalists that are not updated in this period are kept longer for further research and updating.

The updated data is processed by Mapping Module (22) and used to update Media Database (6). The Journalist records in the Media Database (6) are marked with an appropriate update date.

It should be understood that the preferred embodiment was described to provide the best illustration of the principles of the invention and its practical application to thereby enable one of ordinary skill in the art to utilize the invention in various embodiments and with various modifications as are suited to the particular use contemplated.

What is claimed is:

1. A computer-implemented system for integrating and searching media related databases comprising:
a first server configured to receive digital content from at least one of a plurality of sources, and being further configured to forward the digital content to a content database;
a second server including a search engine that is configured to provide at least one web page to at least one of a plurality of user computing devices, the second server being further configured to receive queries from the at least one of the plurality of user computing devices;
a database access layer configured to be utilized by the first server and the second server to read and write to a plurality of databases, wherein the plurality of databases comprises the content database, a media database, and a mapping database;

the content database being configured to receive at least one article of digital content from the first server via the database access layer and the content database being further configured to store the received at least one article of digital content;

the media database being configured to store at least one journalist data element and at least one media outlet data element;

the mapping database being configured to store at least one mapping data, wherein the at least one mapping data identifies a mapping between a set of article data stored in the content database and a set of media data stored in the media database, wherein the set of article data comprises at least one byline data element and at least one source outlet data element of at least one article of digital content stored in the content database, and wherein the set of media data comprises at least one journalist data element and at least one media outlet data element stored in the media database;

a mapping module configured to:
  determine a mapping between a set of article data of the received at least one article of digital content and the set of media data stored in the media database, wherein the set of article data of the received at least one article of digital content comprises at least one byline data element and at least one source outlet data element, and
  determine whether the determined mapping matches at least one mapping identified by the at least one mapping data stored in the mapping database; and a list builder module configured to, responsive to the second server receiving a query from a user computing device, present a list of one or more journalists to the user computing device as a formatted web page with links to more detailed information, wherein the received query comprises at least one of a press release document and a cut and paste content of the press release document, and wherein each listed journalist in the formatted web page with links corresponds to a journalist data element in the mapping database that is mapped to an article of digital content that has a predefined percentage of content that matches the query.

2. The computer-implemented system of claim 1, wherein the mapping module is further configured to store the determined mapping in the mapping database upon a determination that the determined mapping does not match at least one mapping identified by the at least one mapping data.

3. The computer-implemented system of claim 1, further comprising a report database that is configured to store user report requests.

4. The computer-implemented system of claim 1, further comprising an indexing database that is configured to receive the digital content from the first server and to maintain an index of the digital content.

5. The computer-implemented system of claim 4, further comprising an archiver that is configured to receive the digital content from the indexing database, to manage the indexing database, and to store the digital content.

6. The computer-implemented system of claim 5, wherein the archiver further comprises a full archive that is configured to store a complete text of the digital content for a predetermined period of days and a summary archive that is configured to store a summary of the digital content after the predetermined period of days.

7. The computer-implemented system of claim 4, wherein the search engine receives the press release document or the cut and paste content of the press release document at the at least one web page from the at least one of the plurality of user computing devices.

8. The computer-implemented system of claim 7, wherein the second server further includes an upload document module that is configured to create a new category in the indexing database using an application processing index and to set one of the press release document and the cut and paste content of the press release document as a training document for a press release.

9. The computer-implemented system of claim 1, wherein the more detailed information includes a list of recent headlines or storylines authored by each listed journalist in the formatted web page with links.

10. The computer-implemented system of claim 9, wherein the second server further includes a list builder that queries the indexing database for a list of all articles including their mapped journalist identities in the created new category.

11. The computer-implemented system of claim 10, wherein the list builder sorts the list of articles by relevance, applies filters as needed and looks up media contact information for each article from the media database.

12. The computer-implemented system of claim 11, wherein the list builder presents the sorted list of articles to the user computing device as the formatted web page with links to the more detailed information including a list of recent headlines or storylines authored by the relevant journalist of each article, an abstract for each article, and a stored copy of the entire copy of each article.

13. The computer-implemented system of claim 1, wherein the first server includes a pre-parser that is configured to receive the digital content including a plurality of articles and to parse out a plurality of data elements from each of the plurality of articles in the digital content.

14. The computer-implemented system of claim 13, wherein the parsed out plurality of data elements include at least one of a headline, a byline, a date, a media outlet source, a content body, and a section.

15. The computer-implemented system of claim 13, wherein the pre-parser is further configured to forward the parsed out plurality of data elements of the digital content to the mapping module,
  wherein the mapping module uses the parsed out plurality of data elements of the digital content to determine the mapping between the set of article data of the received at least one article of digital content and the set of media data stored in the media database,
  wherein the mapping module is further configured to forward the parsed out plurality of data elements of the digital content to a matched content database of the content database upon a determination that the determined mapping matches at least one mapping identified by the at least one mapping data, and
  wherein the mapping module is further configured to forward the parsed out plurality of data elements of the digital content to an unmatched content database of the content database upon a determination that the determined mapping does not match the at least one mapping identified by the at least one mapping data.

16. The computer-implemented system of claim 15, wherein the first server further includes an exceptions processor configured to pull unmatched digital content data from the unmatched content database, to format a call down project to telemarketers to update the unmatched digital content data, and to forward the updated unmatched digital content data to the content database via the mapping module.

17. The computer-implemented system of claim 16, wherein the pre-parser generates a normalized Extensible Markup Language (XML) file of the updated unmatched digital content data for processing by the indexing database.

18. The computer-implemented system of claim 13, wherein the pre-parser is further configured to send the XML file to an XML feed that passes the XML file to the indexing database.

19. The computer-implemented system of claim 15, wherein the queries include at least one of a journalist name, a media outlet name and a keyword.

20. The computer-implemented system of claim 19, wherein the search engine receives the query from the user computing device and the search engine compares query data to data in the matched content database.

21. The computer-implemented system of claim 20, wherein the search engine receives query results including a mapping of the article contents and identifiers of the media outlet and the journalist with the related article of digital content.

22. The computer-implemented system of claim 21, wherein the search engine queries the media database for media contact data about the media outlet and the journalist and then provides the results of the query of the media database to the user computing device as the formatted web page with links to the more detailed information.

23. The computer-implemented system of claim 8, wherein the indexing database uses the training document to search for articles of digital content with the predefined percentage of content and creates a new category of such articles of digital content.

24. The computer-implemented system of claim 1, wherein the second server further includes a system web page for user criteria including an industry, brand names, and a date range to be input by a user and a gathers report application for receiving the user criteria via the system web page.

25. The computer-implemented system of claim 24, wherein the gathers report application parses the input by the user, generates a standard report request and forwards the generated standard report request to the report database to be stored.

26. The computer-implemented system of claim 25, wherein the second server further includes a report builder for receiving the generated standard report request from the report database and formatting queries against the indexing database.

27. The computer-implemented system of claim 26, wherein the indexing database returns the results of the formatted queries including statistics and supporting articles to the report builder.

28. The computer-implemented system of claim 27, wherein the report builder further receives data from the media database and provides the results of the formatted queries and the data from the media database to the user computing device as a formatted web page with custom industry reports and links to the more detailed information.

29. The computer-implemented system of claim 28, wherein the plurality of data elements include a headline, a media outlet source, and a section where broadcast or print edition of the article of digital content was found.

30. The computer-implemented system of claim 29, wherein the pre-parser sends the plurality of data elements from each article of the digital content to the mapping module for determining the mapping between each article's source and byline, and the media outlet data and the journalist data in the media database.

31. The computer-implemented system of claim 29, wherein, when the mapping module determines that the determined mapping matches at least one mapping identified by the at least one mapping data stored in the mapping database, the section data element is used to confirm or update a beat data element or a coverage data element that corresponds to the mapped journalist data element and the mapped journalist data element is marked as active in the mapping database.

32. The computer-implemented system of claim 29, wherein the mapping module is further configured to:
    determine whether the at least one journalist data element in the set of media data maps to a source outlet data element that is different from the at least one source outlet data element in the set of article data, and
    upon a determination that the at least one journalist data element in the set of media data maps to the source outlet data element that is different from the at least one source outlet data element in the set of article data, note the possible alternate source corresponding to the source outlet data element and mark the at least one journalist data element as requiring update in the mapping database.

33. The computer-implemented system of claim 32, wherein the first server further includes an exception processor that is configured to process journalist data elements and to remove duplicate journalist data elements, and wherein the mapping module is further configured to send the at least one journalist data element requiring update to the exception processor for updating, and wherein the exception processor is further configured to send the at least one journalist data element requiring update to a telemarketer for updating.

34. The computer-implemented system of claim 33, wherein the telemarketer receives contact information corresponding to the noted possible alternate source and all parsed information corresponding to the at least one journalist data element requiring update, wherein the telemarketer uses a customized script to obtain contact information and beat information corresponding to the at least one journalist data element requiring update, and wherein the telemarketer updates the at least one journalist data element requiring update.

35. The computer-implemented system of claim 34, wherein the telemarketer forwards the updated at least one journalist data element to the mapping module, wherein the mapping module forwards the updated at least one journalist data element to the media database, and wherein the media database marks the updated at least one journalist data element with an update date.

36. The computer-implemented system of claim 29, wherein the mapping module is further configured to, upon a determination that the determined mapping does not match at least one mapping identified by the at least one mapping data stored in the mapping database:
    generate a mapping between the at least one journalist data element and the at least one source outlet data element,
    mark the generated mapping between the at least one journalist data element and the at least one source outlet data element as new, and
    store the generated mapping in a daily exception report in the mapping database.

37. The computer-implemented system of claim 36, wherein the first server further includes an exception processor that is configured to process journalist data elements and to remove duplicate journalist data elements, wherein the mapping module is further configured to send the at least one journalist data element and the at least one source outlet data element of the generated mapping to the exception processor for updating, and wherein the exception processor sends the at least one journalist data element and the at least one source outlet data element of the generated mapping to a telemarketer for updating.

38. The computer-implemented system of claim 36, wherein a telemarketer receives contact information corresponding to the at least one source outlet data element of the generated mapping and all parsed information corresponding to the at least one journalist data element of the generated mapping, wherein the telemarketer uses a customized script to obtain contact information and beat information corresponding to the at least one journalist data element of the generated mapping, and wherein the telemarketer updates the at least one journalist data element of the generated mapping.

39. The computer-implemented system of claim 38, wherein the telemarketer forwards the updated at least one journalist data element to the mapping module, wherein the mapping module forwards the updated at least one journalist data element to the media database, and wherein the media database marks the updated at least one journalist data element with an update date.

40. A computer implemented system for integrating and searching media related databases comprising:
   a first server configured to receive digital content from at least one of a plurality of sources, and being further configured to the forward digital content to a content database;
   a second server including a search engine that is configured to provide at least one web page to at least one of a plurality of user computing devices, the second server being further configured to receive queries from the at least one of the plurality of user computing devices;
   a database access layer configured to be utilized by the first server and the second server to read and write to a plurality of databases, wherein the plurality of databases comprises the content database, a media database, a mapping database, and a report database;
   the content database being configured to receive at least one article of digital content from the first server via the database access layer and to store the received at least one article of digital content;
   the media database being configured to receive at least one journalist data element and at least one media outlet data element from the first server via the database access layer and to store the at least one journalist data element and the at least one media outlet data element;
   the mapping database being configured to store at least one mapping data, wherein the at least one mapping data identifies a mapping between a set of article data stored in the content database and a set of media data stored in the media database, wherein the set of article data comprises at least one byline data element and at least one source outlet data element of at least one article of digital content stored in the content database, and wherein the set of media data comprises at least one journalist data element and at least one media outlet data element stored in the media database;
   the report database being configured to store at least one user report request, and a list builder module configured to, responsive to the second server receiving a query from a user computing device, present a list of one or more journalists to the user computing device as a formatted web page with links to more detailed information,
   wherein the received query comprises at least one of a press release document and a cut and paste content of a press release document, and
   wherein each listed journalist in the formatted web page with links corresponds to a journalist data element in the mapping database that is mapped to an article of digital content that has a predefined percentage of content that matches the query.

41. The computer-implemented system of claim 40, further comprising an indexing database that is configured to receive the digital content from the first server and to maintain an index of the digital content.

42. The computer-implemented system of claim 41, further comprising an archiver that is configured to receive the digital content from the indexing database, to manage the indexing database, and to store the digital content.

43. The computer-implemented system of claim 42, wherein the archiver further comprises a full archive that is configured to store a complete text of the digital content for a predetermined period of days and a summary archive that is configured to store a summary of the digital content after the predetermined period of days.

44. The computer-implemented system of claim 41, wherein the first server further includes a mapping module configured to:
   determine a mapping between a set of article data of the received at least one article of digital content and the set of media data stored in the media database, wherein the set of article data of the received at least one article of digital content comprises at least one byline data element and at least one source outlet data element, and
   determine whether the determined mapping matches at least one mapping identified by the at least one mapping data stored in the mapping database,
   forward parsed out plurality of data elements of the digital content to an unmatched content database of the content database upon a determination that the determined mapping does not match the at least one mapping identified by the at least one mapping data, and
   forward parsed out plurality of data elements of the digital content to a match content database of the content database upon a determination that the determined mapping does match at least one mapping identified by the at least one mapping data;
   wherein the first server forwards the digital content to the mapping module.

45. The computer-implemented system of claim 44, wherein the queries include at least one of a journalist name, a media outlet name and a keyword.

46. The computer-implemented system of claim 45, wherein the search engine receives from the user computing device and the search engine compares query data to data in the matched content database.

47. The computer-implemented system of claim 46, wherein the search engine receives query results including a mapping of the article contents and identifiers of the media outlet and the journalist with the related article of digital content.

48. The computer-implemented system of claim 47, wherein the search engine queries the media database for media contact data about the media outlet and the journalist and then provides the results of the query of the media database to the user computing device as the formatted web page with links to the more detailed information.

49. The computer-implemented system of claim 48, wherein the search engine receives the press release document or the cut and paste content of the press release document at the at least one web page from the at least one of the plurality of user computing devices.

50. The computer-implemented system of claim 49, wherein the second server further includes an upload document module that is configured to create a new category in the indexing database using an application processing index and to set one of the press release document and the cut and paste content of the press release document as a training document for a press release.

51. The computer-implemented system of claim 50, wherein the indexing database uses the training document to search for articles of digital content with a predefined percentage of content and creates a new category of such articles of digital content.

52. The computer-implemented system of claim 51, wherein the second server further includes a list builder that queries the indexing database for a list of all articles including their mapped journalist identities in the created new category.

53. The computer-implemented system of claim 52, wherein the list builder sorts the list of articles by relevance, applies filters as needed and looks up media contact information for each article from the media database.

54. The computer-implemented system of claim 53, wherein the list builder presents the sorted list of articles to the user computing device as the formatted web page with links to the more detailed information including a list of recent headlines or storylines authored by the relevant journalist of each article, an abstract for each article, and a stored copy of the entire copy of each article.

55. The computer-implemented system of claim 40, wherein the first server includes a pre-parser that is configured to receive the digital content including a plurality of articles and to parse out a plurality of data elements from each of the plurality of articles in the digital content.

56. The computer-implemented system of claim 55, wherein the parsed out plurality of data elements include at least one of a headline, a byline, a date, a media outlet source, a content body, and a section.

57. The computer-implemented system of claim 55, wherein the first server further includes a mapping module configured to:
  determine a mapping between a set of article data of the received at least one article of digital content and the set of media data stored in the media database, wherein the set of article data of the received at least one article of digital content comprises at least one byline data element and at least one source outlet data element, and
  determine whether the determined mapping matches at least one mapping identified by the at least one mapping data stored in the mapping database,
  forward the parsed out plurality of data elements of the digital content to an unmatched content database of the content database upon a determination that the determined mapping does not match the at least one mapping identified by the at least one mapping data, and
  forward the parsed out plurality of data elements of the digital content to a match content database of the content database upon a determination that the determined mapping does match at least one mapping identified by the at least one mapping data; and
  wherein the pre-parser forwards the parsed out plurality of data elements of the digital content to the mapping module.

58. The computer-implemented system of claim 57, wherein the first server further includes an exceptions processor that is configured to pull unmatched digital content data from the unmatched content database, to format a call down project to telemarketers to update the unmatched digital content data, and to forward the updated unmatched digital content data to the content database via the mapping module.

59. The computer-implemented system of claim 58, wherein the pre-parser generates a normalized Extensible Markup Language (XML) file of the updated unmatched digital content data for processing by the indexing database.

60. The computer-implemented system of claim 59, wherein the pre-parser is further configured to send the XML file to an XML feed that passes the XML file to the indexing database.

61. The computer-implemented system of claim 57, wherein the plurality of data elements include a headline, a media outlet source, and a section where broadcast or print edition of the article of digital content was found.

62. The computer-implemented system of claim 61, wherein the pre-parser sends the plurality of data elements from each article of the digital content to the mapping module for determining the mapping between each article's source and byline, and the media outlet data and the journalist data in the media database.

63. The computer-implemented system of claim 62, wherein when the mapping module determines that the determined mapping matches at least one mapping identified by the at least one mapping data stored in the mapping database, the section data element is used to confirm or update a beat data element or a coverage data element that corresponds to the mapped journalist data element and the mapped journalist data element is marked as active in the mapping database.

64. The computer-implemented system of claim 62, wherein the mapping module is further configured to:
  determine whether the at least one journalist data element in the set of media data maps to a source outlet data element that is different from the at least one source outlet data element in the set of article data, and
  upon a determination that the at least one journalist data element in the set of media data maps to the source outlet data element that is different from the at least one source outlet data element in the set of article data, note the possible alternate source corresponding to the source outlet data element and mark the at least one journalist data element as requiring update in the mapping database.

65. The computer-implemented system of claim 64, wherein the first server further includes an exception processor that is configured to process journalist data elements and to remove duplicate journalist data elements, wherein the mapping module is further configured to send the at least one journalist data element requiring update to the exception processor for updating, and wherein the exception processor sends the at least one journalist data element requiring update to a telemarketer for updating.

66. The computer-implemented system of claim 65, wherein the telemarketer receives contact information corresponding to the noted possible alternate source and all parsed information corresponding to the at least one journalist data element requiring update, wherein the telemarketer uses a customized script to obtain and update contact information and beat information corresponding to the at least one journalist data element requiring update, and wherein the telemarketer updates the at least one journalist data element requiring update.

67. The computer-implemented system of claim 66, wherein the telemarketer forwards the updated at least one journalist data element to the mapping module, wherein the mapping module forwards the updated at least one journalist data element to the media database, and wherein the media database marks the updated at least one journalist data element with an update date.

68. The computer-implemented system of claim 62, wherein the mapping module is further configured to, upon a determination that the determined mapping does not match at least one mapping identified by the at least one mapping data stored in the mapping database:
generate a mapping between the at least one journalist data element and the at least one source outlet data element,
mark the generated mapping between the at least one journalist data element and the at least one source outlet data element as new, and
store the generated mapping in a daily exception report in the mapping database.

69. The computer-implemented system of claim 68, wherein the first server further includes an exception processor that is configured to process journalist data elements and to remove duplicate journalist data elements, wherein the mapping module is further configured to send the at least one journalist data element and the at least one source outlet data element of the generated mapping to the exception processor for updating, and wherein the exception processor sends the at least one journalist data element and the at least one source outlet data element of the generated mapping to a telemarketer for updating.

70. The computer-implemented system of claim 69, wherein the telemarketer receives contact information corresponding to the at least one source outlet data element of the generated mapping and all parsed information corresponding to the at least one journalist data element of the generated mapping, wherein the telemarketer uses a customized script to obtain contact information and beat information corresponding to the at least one journalist data element of the generated mapping, and wherein the telemarketer updates the at least one journalist data element of the generated mapping.

71. The computer-implemented system of claim 70, wherein the telemarketer forwards the updated at least one journalist data element to the mapping module, wherein the mapping module forwards the updated at least one journalist data element to the media database, and wherein the media database marks the updated at least one journalist data element with an update date.

72. The computer-implemented system of claim 40, wherein the second server further includes a system web page for user criteria including an industry, brand names, and a date range to be input by a user and a gathers report application for receiving the user criteria via the system web page.

73. The computer-implemented system of claim 72, wherein the gathers report application parses the input by the user, generates a standard report request and forwards the generated standard report request to the report database to be stored.

74. The computer-implemented system of claim 73, wherein the second server further includes a report builder for receiving the generated standard report request from the report database and formatting queries against the indexing database.

75. The computer-implemented system of claim 74, wherein the indexing database returns the results of the formatted queries including statistics and supporting articles to the report builder.

76. The computer-implemented system of claim 75, wherein the report builder further receives data from the media database and provides the results of the formatted queries and the data from the media database to the user computing device as a formatted web page with custom industry reports and links to the more detailed information.

77. A method for integrating and updating media related databases comprising:
receiving digital content from at least one of a plurality of sources at a first server;
receiving at least one article of digital content from the first server and storing the at least one article of digital in a content database;
receiving at least one journalist data element and at least one media outlet data element from the first server and storing the at least one journalist data element and the at least one media outlet data element in a media database;
determining a mapping between a set of article data of the received at least one article of digital content and a set of media data stored in the media database, wherein the set of article data of the received at least one article of digital content comprises at least one byline data element and at least one source outlet data element, and wherein the set of media data comprises the at least one journalist data element and the at least one media outlet data element stored in the media database;
storing the determined mapping as mapping data in a mapping database;
receiving a query from at least one of a plurality of user computing devices at a second server; and
responsive to the received query from the at least one of the plurality of user computing devices, presenting a list of one or more journalists to the at least one of the plurality of user computing devices as a formatted web page with links to more detailed information,
wherein the received query comprises at least one of a press release document and a cut and paste content of the press release document, and
wherein each listed journalist in the formatted web page with links corresponds to a journalist data element in the mapping database that is mapped to an article of digital content that has a predefined percentage of content that matches the query.

78. The method of claim 77, further comprising maintaining an index of the received digital content from the first server in an indexing database.

79. The method of claim 78, further comprising managing the indexing database and storing the digital content in an archiver.

80. The method of claim 79, further comprising:
storing text of the digital content for a predetermined period of days in an archive section of the archiver; and
storing a summary of the digital content after the predetermined period of days in a summary archive section of the archiver.

* * * * *